(12) United States Patent
Marchione

(10) Patent No.: US 6,182,558 B1
(45) Date of Patent: Feb. 6, 2001

(54) BAGEL MAKING APPARATUS

(76) Inventor: Richard Marchione, 3333 Henry Hudson Pkwy., Bronx, NY (US) 10463

(*) Notice: Under 35 U.S.C. 154(b), the term of this patent shall be extended for 0 days.

(21) Appl. No.: 09/612,081

(22) Filed: Jul. 7, 2000

(51) Int. Cl.[7] .............................. A23L 1/00; A47J 27/00; A47J 27/10; A47J 37/00; A47J 37/12

(52) U.S. Cl. ............................. 99/339; 99/339; 99/342; 99/348; 99/448; 99/450; 99/476; 219/401

(58) Field of Search .............................. 99/326–334, 339, 99/340, 348, 342, 403–412, 448, 450, 476, 477, 468, 483; 366/98, 314, 601, 144–146; 219/400, 401; 126/21 A

(56) References Cited

U.S. PATENT DOCUMENTS

| | | | |
|---|---|---|---|
| 5,526,734 | * 6/1996 | Harrison | 99/339 |
| 5,588,352 | * 12/1996 | Harrison | 99/339 |
| 5,590,583 | * 1/1997 | Harrison | 99/327 |
| 5,682,809 | * 11/1997 | Harrison | 99/339 |
| 5,937,740 | * 8/1999 | Kubotoa et al. | 99/327 |
| 5,967,020 | * 10/1999 | Soyama et al. | 99/327 |

* cited by examiner

*Primary Examiner*—Timothy F. Simone

(57) ABSTRACT

A bagel making apparatus for making bagels at home either by baking or boiling the dough. The bagel making apparatus includes a housing having a front side wall, back side wall, a top side, a top wall covering a portion of the top side, end walls, a bottom wall, an opening in the top side, and a baking chamber being disposed therein with the housing further having a water container compartment disposed therein and being accessible through the opening in the top side and with the front side wall having an opening extending therethrough into the baking chamber of the housing; and also includes a lid having a main wall, side walls, and end walls, one of the end walls being hingedly attached to the back side wall with the lid being closeable over the opening in the top side with the lid further having a plurality of apertures being spaced apart and extending through the main wall and further having a handle securely attached to the other of the end walls; and further includes a drawer-like tray support member being slidable into the baking chamber through the opening in the front side wall; and also includes tray members being removably supported upon the drawer-like tray support member; and further includes a heating assembly for heating the baking chamber and the water container compartment for making bagels; and also includes a bagel hole maker for making holes in the bagels.

9 Claims, 4 Drawing Sheets

BAGEL MAKING APPARATUS

BACKGROUND OF THE INVENTION

1. Field of the Invention

The present invention relates to a dual home bagel maker and more particularly pertains to a new bagel making apparatus for making bagels at home either by baking or boiling the dough.

2. Description of the Prior Art

The use of a dual home bagel maker is known in the prior art. More specifically, a dual home bagel maker heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,526,734; 5,682,809; 5,590,583; U.S. Pat. No. Des. 378,484; U.S. Pat. No. Des. 381,861; and U.S. Pat. No. 5,694,831.

While these devices fulfill their respective, particular objectives and requirements, the aforementioned patents do not disclose a new bagel making apparatus. The inventive device includes a housing having a front side wall, back side wall, a top side, a top wall covering a portion of the top side, end walls, a bottom wall, an opening in the top side, and a baking chamber being disposed therein with the housing further having a water container compartment disposed therein and being accessible through the opening in the top side and with the front side wall having an opening extending therethrough into the baking chamber of the housing; and also includes a lid having a main wall, side walls, and end walls, one of the end walls being hingedly attached to the back side wall with the lid being closeable over the opening in the top side with the lid further having a plurality of apertures being spaced apart and extending through the main wall and further having a handle securely attached to the other of the end walls; and further includes a drawer-like tray support member being slidable into the baking chamber through the opening in the front side wall; and also includes tray members being removably supported upon the drawer-like tray support member; and further includes a heating assembly for heating the baking chamber and the water container compartment for making bagels; and also includes a bagel hole maker for making holes in the bagels.

In these respects, the bagel making apparatus according to the present invention substantially departs from the conventional concepts and designs of the prior art, and in so doing provides an apparatus primarily developed for the purpose of making bagels at home either by baking or boiling the dough.

SUMMARY OF THE INVENTION

In view of the foregoing disadvantages inherent in the known types of dual home bagel maker now present in the prior art, the present invention provides a new bagel making apparatus construction wherein the same can be utilized for making bagels at home either by baking or boiling the dough.

The general purpose of the present invention, which will be described subsequently in greater detail, is to provide a new bagel making apparatus which has many of the advantages of the dual home bagel maker mentioned heretofore and many novel features that result in a new bagel making apparatus which is not anticipated, rendered obvious, suggested, or even implied by any of the prior art dual home bagel maker, either alone or in any combination thereof.

To attain this, the present invention generally comprises a housing having a front side wall, back side wall, a top side, a top wall covering a portion of the top side, end walls, a bottom wall, an opening in the top side, and a baking chamber being disposed therein with the housing further having a water container compartment disposed therein and being accessible through the opening in the top side and with the front side wall having an opening extending therethrough into the baking chamber of the housing; and also includes a lid having a main wall, side walls, and end walls, one of the end walls being hingedly attached to the back side wall with the lid being closeable over the opening in the top side with the lid further having a plurality of apertures being spaced apart and extending through the main wall and further having a handle securely attached to the other of the end walls; and further includes a drawer-like tray support member being slidable into the baking chamber through the opening in the front side wall; and also includes tray members being removably supported upon the drawer-like tray support member; and further includes a heating assembly for heating the baking chamber and the water container compartment for making bagels; and also includes a bagel hole maker for making holes in the bagels.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bagel making apparatus which has many of the advantages of the dual home bagel maker mentioned heretofore and many novel features that result in a new bagel making apparatus which is not anticipated, rendered obvious, suggested, or even implied by any of the prior art dual home bagel maker, either alone or in any combination thereof.

It is another object of the present invention to provide a new bagel making apparatus which may be easily and efficiently manufactured and marketed.

It is a further object of the present invention to provide a new bagel making apparatus which is of a durable and reliable construction.

An even further object of the present invention is to provide a new bagel making apparatus which is susceptible of a low cost of manufacture with regard to both materials and labor, and which accordingly is then susceptible of low prices of sale to the consuming public, thereby making such bagel making apparatus economically available to the buying public.

Still yet another object of the present invention is to provide a new bagel making apparatus which provides in the apparatuses and methods of the prior art some of the advantages thereof, while simultaneously overcoming some of the disadvantages normally associated therewith.

Still another object of the present invention is to provide a new bagel making apparatus for making bagels at home either by baking or boiling the dough.

Yet another object of the present invention is to provide a new bagel making apparatus which includes a housing having a front side wall, back side wall, a top side, a top wall covering a portion of the top side, end walls, a bottom wall, an opening in the top side, and a baking chamber being disposed therein with the housing further having a water container compartment disposed therein and being accessible through the opening in the top side and with the front side wall having an opening extending therethrough into the baking chamber of the housing; and also includes a lid having a main wall, side walls, and end walls, one of the end walls being hingedly attached to the back side wall with the lid being closeable over the opening in the top side with the lid further having a plurality of apertures being spaced apart and extending through the main wall and further having a handle securely attached to the other of the end walls; and further includes a drawer-like tray support member being slidable into the baking chamber through the opening in the front side wall; and also includes tray members being removably supported upon the drawer-like tray support member; and further includes a heating assembly for heating the baking chamber and the water container compartment for making bagels; and also includes a bagel hole maker for making holes in the bagels.

Still yet another object of the present invention is to provide a new bagel making apparatus that allows the user to effectively make bagels either by baking or by boiling.

Even still another object of the present invention is to provide a new bagel making apparatus that is simple and convenient to use at home for making bagels.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
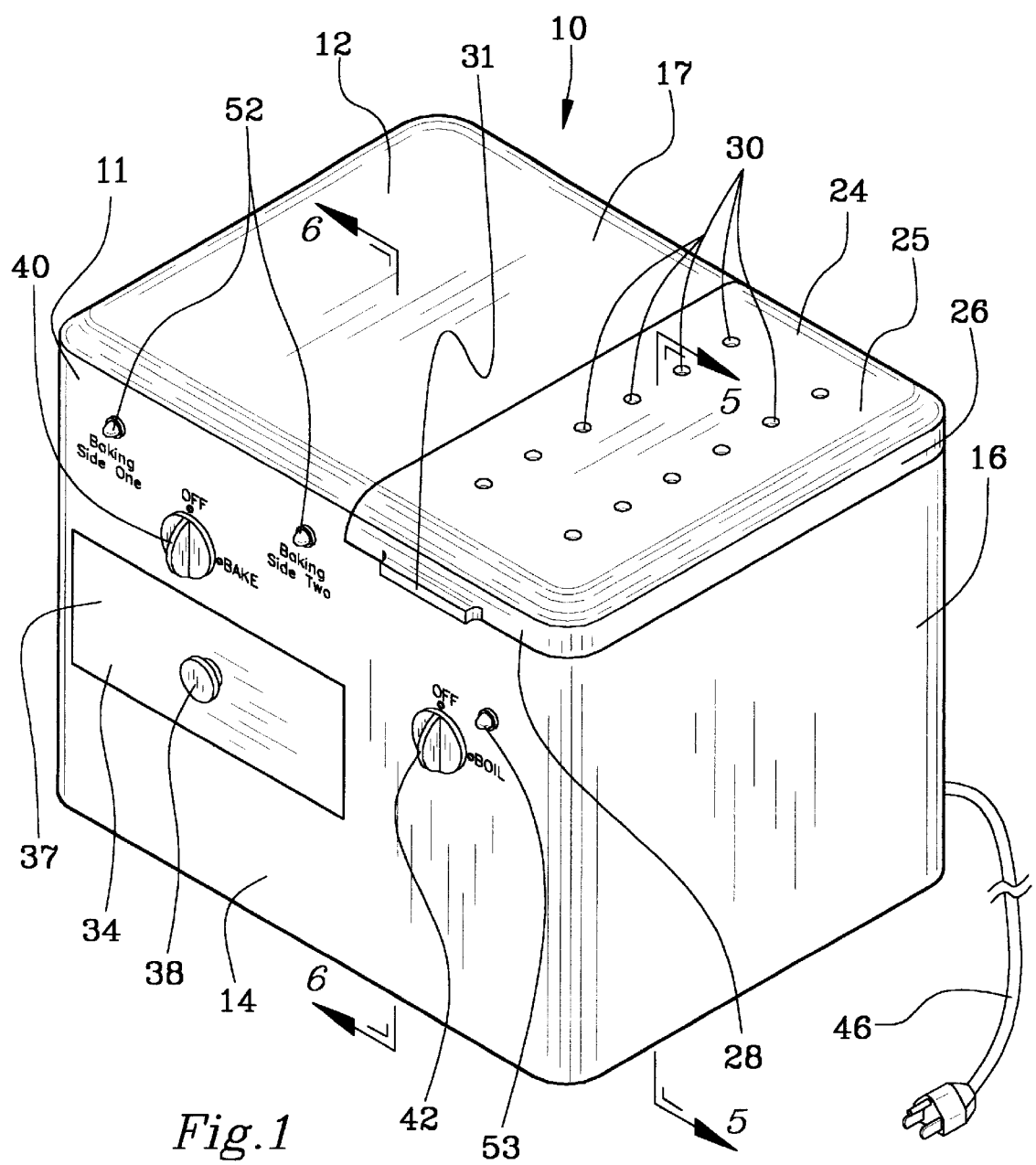
FIG. 1 is a perspective view of a new bagel making apparatus according to the present invention.
Figure 2:
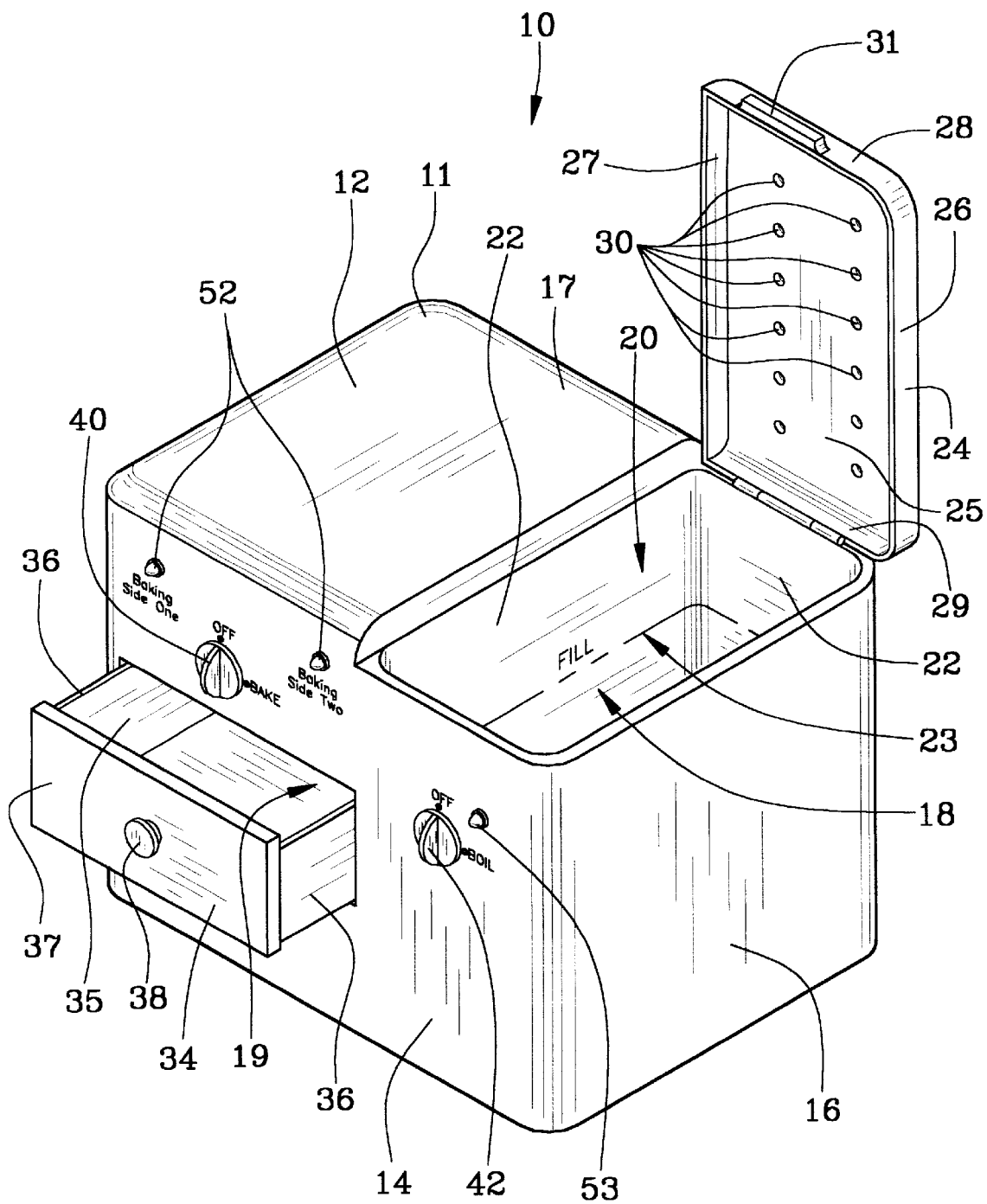
FIG. 2 is another perspective view of the present invention.
Figure 3:
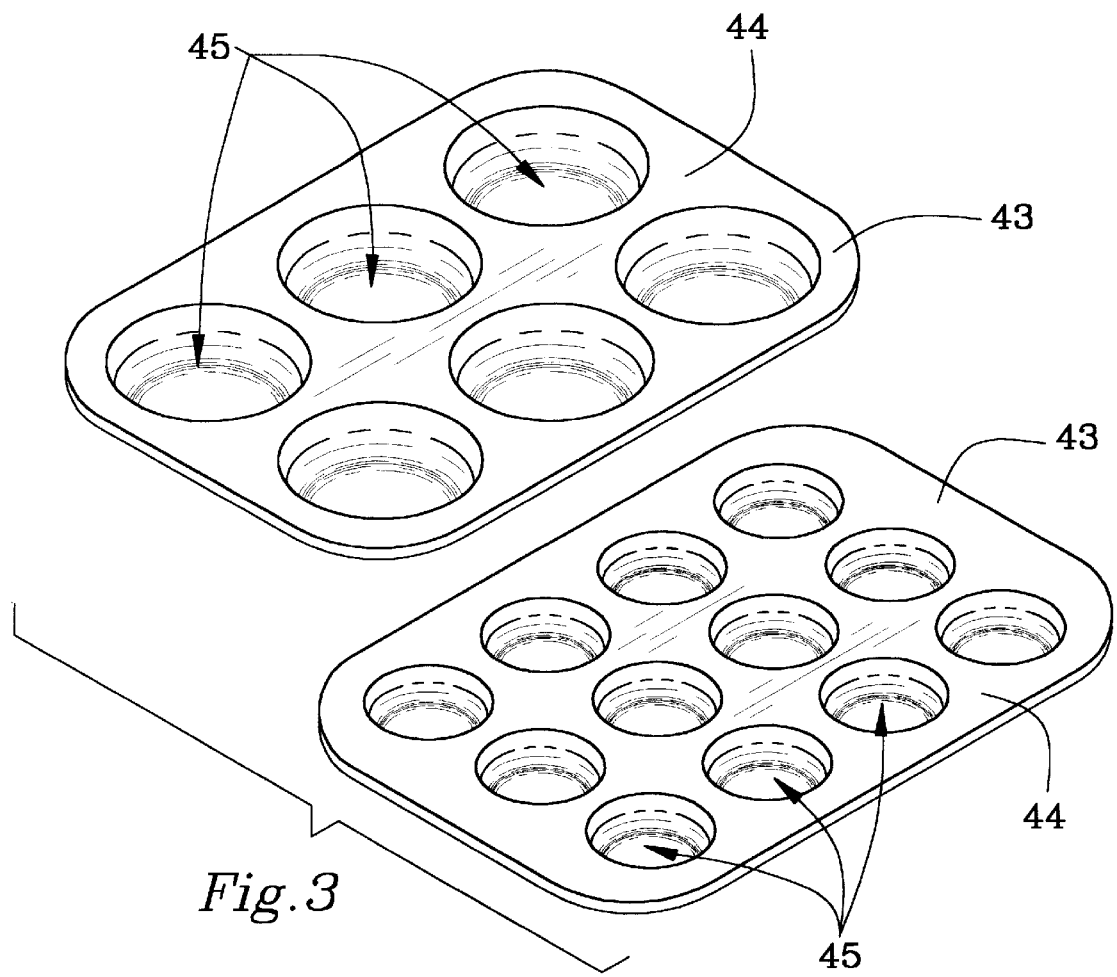
FIG. 3 is a perspective view of the tray members of the present invention.
Figure 4:
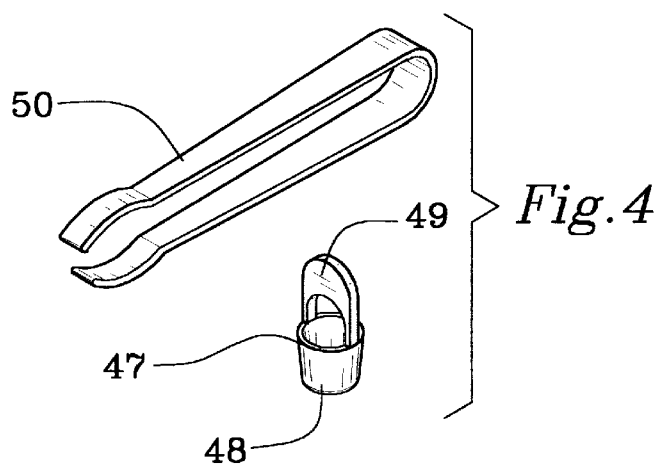
FIG. 4 is a perspective view of the bagel hole maker and the tongs of the present invention.
Figure 5:
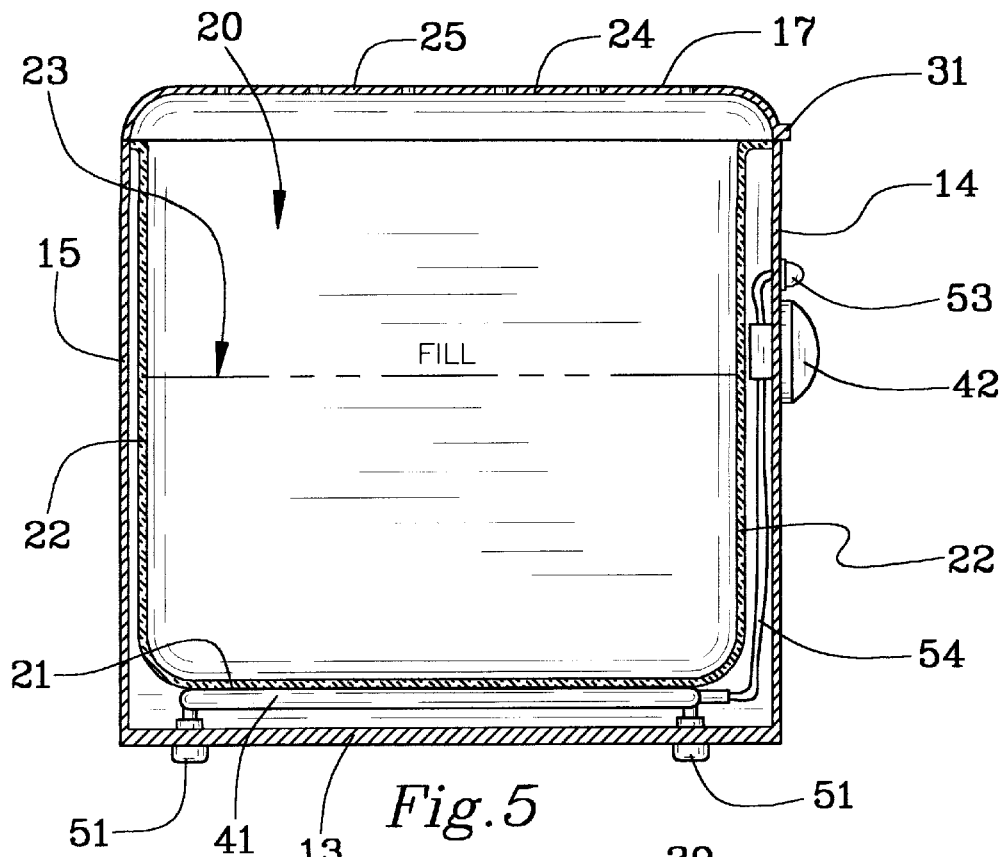
FIG. 5 is one cross-sectional view of the present invention.
Figure 6:
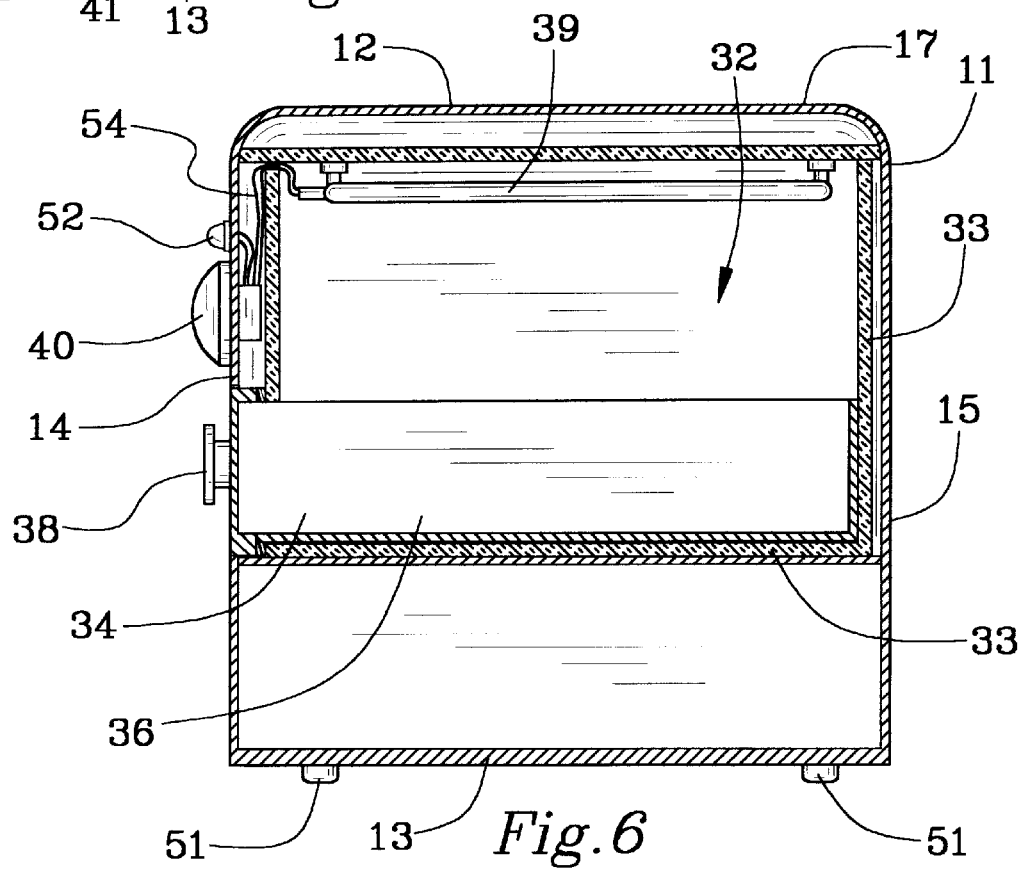
FIG. 6 is another cross-sectional view of the present invention.

With reference now to the drawings, and in particular to FIGS. 1 through 6 thereof, a new bagel making apparatus embodying the principles and concepts of the present invention and generally designated by the reference numeral 10 will be described.

As best illustrated in FIGS. 1 through 6, the bagel making apparatus 10 generally comprises a housing 11 having a front side wall 14, back side wall 15, a top side 17, a top wall 12 covering a portion of the top side 17, and also having end walls 16, a bottom wall 13, an opening in the top side 18, and a baking chamber 32 being disposed therein. The housing 11 further has a water container compartment 20 disposed therein and being accessible through the opening 18 in the top side 17. The front side wall 14 has an opening 19 extending therethrough into the baking chamber 32 of the housing 11. The water container member 20 includes side walls 22, an open top, a bottom wall 21 spaced above the bottom wall 13 of the housing 11, and markings 23 on the side walls 22 for indicating water fill level within the water container member 20. The housing 11 includes feet members 51 securely and conventionally disposed upon the bottom wall 13 thereof for supporting the housing 11 upon a surface. The housing 11 further includes insulated material 33 securely disposed within the baking chamber 32 and being securely attached to walls of the baking chamber 32. The bagel making apparatus 10 also includes a lid 24 having a main wall 25, side walls 26,27, and end walls 28,29, one of the end walls 29 being hingedly attached to the back side wall 15 with the lid 24 being closeable over the opening 18 in the top side 17 with the lid 24 further having a plurality of apertures 30 being spaced apart and extending through the main wall 25 and also having a handle 31 securely attached to the other of said end walls 28 thereof.

A drawer-like tray support member 34 is slidable into the baking chamber 32 through the opening 19 in the front side wall 14. The drawer-like tray support member 34 includes a front end wall 37, side walls 36, a bottom wall 35, and a knob-like handle member 38 being securely and conventionally attached to an exterior of the front end wall 37 for moving the drawer-like tray support member 34. Tray members 43 are removably supported upon the drawer-like tray support member 34 with each of the tray members 43 including a main wall 44 and a plurality of recessed portions 45 being spaced apart and being disposed in the main wall 44 for holding dough used to make the bagels.

Means for heating the baking chamber 32 and the water container compartment 20 for making bagels includes a first heating element 39 securely and conventionally disposed within the baking chamber 32, and also includes a first switch member 40 movably and conventionally disposed upon the front side wall 14 of the housing 11 and being connected with wires 54 to the first heating element 39, a second heating element 41 being securely and conventionally disposed beneath the bottom wall 21 of the water container member 20 within the housing 11, a second switch member 42 being movably and conventionally disposed upon the front side wall 14 of the housing 11 and being connected with wires 54 to the second heating element 41, a power cord 46 being conventionally connected to the switch members 40,42, and light-emitting indicators 52,53 being securely and conventionally disposed in the front side wall 14 of the housing 11 and being connected to the switch members 40,42 for indicating whether or not the heating elements 39,41 are being energized. The bagel making apparatus 10 further includes a bagel hole maker 47 for making holes in the bagels. The bagel hole maker 47 includes a cylindrical member 48 and a handle 49 securely and conventionally attached to a top of the cylindrical member 48.

In use, the user energizes the heating elements 39,41 by turning the switch members 40,42 one to bake and one to boil if the user intends to use both the baking chamber 32 and the water container member 20 for making the bagels. The dough is placed in the tray members 43 for using the baking chamber 32 or is placed directly into the water container member 20. After the dough rises, the user removes the tray members 43 from the baking chamber 32 or removes the bagels from the water container member 20 by using tongs 50.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bagel making apparatus comprising:
    a housing having a front side wall, back side wall, a top side, a top wall covering a portion of said top side, end walls, a bottom wall, an opening in said top side, and a baking chamber being disposed therein, said housing further having a water container compartment disposed therein and being accessible through said opening in said top side, said front side wall having an opening extending therethrough into said baking chamber of said housing;
    a lid having a main wall, side walls, and end walls, one of said end walls being hingedly attached to said back side wall with said lid being closeable over said opening in said top side, said lid further having a plurality of apertures being spaced apart and extending through said main wall and further having a handle securely attached to the other of said end walls;
    a drawer-like tray support member being slidable into said baking chamber through said opening in said front side wall;
    tray members being removably supported upon said drawer-like tray support member;
    means for heating said baking chamber and said water container compartment for making bagels; and
    a bagel hole maker for making holes in the bagels.

2. A bagel making apparatus as described in claim 1, wherein said water container member includes side walls, and open top, a bottom wall spaced above said bottom wall of said housing, and markings on said side walls for indicating water fill level within said water container member.

3. A bagel making apparatus as described in claim 2, wherein said housing includes feet members securely disposed upon said bottom wall thereof for supporting said housing upon a surface.

4. A bagel making apparatus as described in claim 3, wherein drawer-like tray support member includes a front end wall, side wall, a bottom wall, and a knob-like handle member being securely attached to an exterior of said front end wall for moving said drawer-like tray support member.

5. A bagel making apparatus as described in claim 4, wherein each of said tray members includes a main wall and a plurality of recessed portions being spaced apart and being disposed in said main wall for holding dough used to make the bagels.

6. A bagel making apparatus as described in claim 5, wherein said means for heating said baking chamber and said water container compartment includes a first heating element securely disposed within said baking chamber, a first switch member movably disposed upon said front side wall of said housing and being connected with wires to said first heating element, a second heating element being securely disposed beneath said bottom wall of said water container member within said housing, a second switch member being movably disposed upon said front side wall of said housing and being connected with wires to said second heating element, a power cord being connected to said switch members, and light-emitting indicators being securely disposed in said front side wall of said housing and being connected to said switch members for indicating whether or not said heating elements are being energized.

7. A bagel making apparatus as described in claim 6, wherein said housing further includes insulated material securely disposed within said baking chamber and being securely attached to walls of said baking chamber.

8. A bagel making apparatus as described in claim 7, wherein said bagel hole maker includes a cylindrical member and a handle securely attached to a top of said cylindrical member.

9. A bagel making apparatus comprising:
    a housing having a front side wall, back side wall, a top side, a top wall covering a portion of said top side, end walls, a bottom wall, an opening in said top side, and a baking chamber being disposed therein, said housing further having a water container compartment disposed therein and being accessible through said opening in said top side, said front side wall having an opening extending therethrough into said baking chamber of said housing, said water container member including side walls, and open top, a bottom wall spaced above said bottom wall of said housing, and markings on said side walls for indicating water fill level within said water container member, said housing including feet members securely disposed upon said bottom wall thereof for supporting said housing upon a surface, said housing further including insulated material securely disposed within said baking chamber and being securely attached to walls of said baking chamber;

a lid having a main wall, side walls, and end walls, one of said end walls being hingedly attached to said back side wall with said lid being closeable over said opening in said top side, said lid further having a plurality of apertures being spaced apart and extending through said main wall;

a drawer-like tray support member being slidable into said baking chamber through said opening in said front side wall, said drawer-like tray support member including a front end wall, side wall, a bottom wall, and a knob-like handle member being securely attached to an exterior of said front end wall for moving said drawer-like tray support member;

tray members being removably supported upon said drawerlike tray support member, each of said tray members including a main wall and a plurality of recessed portions being spaced apart and being disposed in said main wall for holding dough used to make the bagels;

means for heating said baking chamber and said water container compartment for making bagels including a first heating element securely disposed within said baking chamber, a first switch member movably disposed upon said front side wall of said housing and being connected with wires to said first heating element, a second heating element being securely disposed beneath said bottom wall of said water container member within said housing, a second switch member being movably disposed upon said front side wall of said housing and being connected with wires to said second heating element, a power cord being connected to said switch members, and light-emitting indicators being securely disposed in said front side wall of said housing and being connected to said switch members for indicating whether or not said heating elements are being energized; and a bagel hole maker for making holes in the bagels, said bagel hole maker including a cylindrical member and a handle securely attached to a top of said cylindrical member.

* * * * *